Oct. 17, 1939.  G. JURKAT  2,176,137

CABLE CONNECTION

Filed July 14, 1937

INVENTOR
Gerhard Jurkat
BY
Paul M. Klein
ATTORNEY

Patented Oct. 17, 1939

2,176,137

UNITED STATES PATENT OFFICE 2,176,137

CABLE CONNECTION

Gerhard Jurkat, Hoboken, N. J.

Application July 14, 1937, Serial No. 153,460

7 Claims. (Cl. 173—324)

This invention relates broadly to connectors for electric conduits, such as cables, and is especially applicable for the use in the electric welding art for electrode and ground clamp holders.

The prime object of this invention is to provide a device of this kind, wherein either two ends of a cable, or one end of a cable and either an electrode holder or a ground clamp may be conveniently and effectively held together in such a way whereby either of the cable ends, or the cable end and an electrode holder or ground clamp may be moved relative to each other, as the case may be, thereby preventing a twisting of the cable and the damaging thereof through such twisting.

Another important object of this invention is to provide within such device conduit-engaging means so constructed and arranged as to assure a positive attachment of a cable, and whereby the cable body is enlarged or widened so that the widened portion prevents the disengagement of the cable from the socket or recess wherein the cable end is held.

The foregoing and still further objects and advantages of the present invention will become more readily apparent from the ensuing description and the accompanying drawing, which latter forms a part of my disclosure, but which is intended primarily to demonstrate the principle of my invention without restricting me to the very structure illustrated, and in which.

Figure 1:
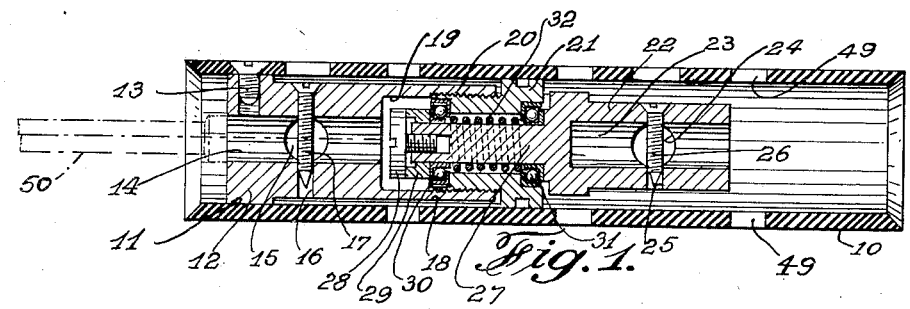
Fig. 1 is a presently preferred embodiment of one form of my invention, shown in section.

Referring now specifically to Fig. 1, numeral 10 denotes a dielectric housing, handle or casing within which is secured a substantially cylindrical member 11, having an end enlargement 12, fixedly secured by means of screw 13 or any other attaching means to handle 10. Through the center of member 12 a cable or tool receiving passage 14 is provided, which latter is transversed by another passage 15, forming side-enlargements of passage 14. Passing at right angles through both of the passages, a third smaller passage 16 is provided, adapted to accommodate either a cable spreading screw 17 or a tool attaching screw, taking the place of the latter. The cable spreading screw, as shown, has a sharp conical end which is intended to pierce and spread the cable as it is forced thereinto.

The body of member 11 is reduced at 18, to provide an air space between housing 10 and member 11. The righthand end of member 11 is internally recessed at 19 and threaded at 20 for accommodating bushing 21. In cooperation with stationary member 11 is another member 22, provided with a cable holding socket or passage 23, which is again transversed by passage 24, and through which two passages a third passage 25 is provided for accommodating a cable spreading screw 26. From member 22 extends a shank 27, the end of which accommodates an adjusting screw 28. The latter bears against a collar or washer 29, forming an abutment or rest for one of the anti-friction bearings 30 of the device. Another such bearing 31 is located at the base of shank 27, and between the two bearings there is inserted an expansion spring 32 adapted to augment the electric contact between members 11 and 22.

Both members are joined together through bushing 21 and are made revoluble relative to one another by the combination radial and thrust bearings 30 and 31. Thus, either one of the two members is free to rotate relative to the other member, while the connection holding the members together forms an electrically conductive joint between the two members so that electricity may pass uninterruptedly from one member into the other. The largest electrical transfer will take place through the balls of the bearings, but in Fig. 1 spring 32 is intended to augment such transfer more readily, although its employment is not absolutely required.

Figure 2:
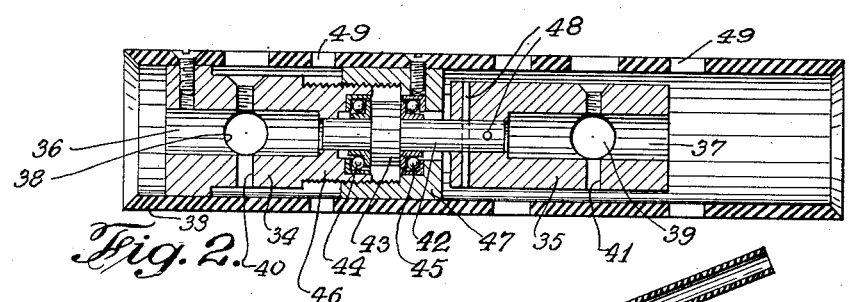
Fig. 2 is a similar sectional view of another embodiment of my device.

Referring now to Fig. 2, the principle of construction, shown in Fig. 1, is the same in this figure with the exception that slight structural changes are made in this modified form, designed for less expensive and standardized manufacture. There is again employed an outer dielectric casing 33, within which is fixedly held a stationary member 34, while movably connected therewith is another member 35. Member 34 again is provided with a tool or cable receiving socket 36, and a similar socket is provided in member 35 at 37. Both of the sockets have transverse passages or sidewise enlargements 38 and 39, respectively, and longitudinal passages 36 and 37 and transverse passages 38 and 39 are pierced at right angles by third passages 40 and 41.

Sockets 36 and 37 terminate in reduced bores for accommodating a connecting shank 42, provided with an enlargement 43 against both faces of which latter are mounted anti-friction bearings 44 and 45. The interior portion of stationary member 34 is reduced and threaded at 46 for accommodating an exterior bushing 47, which holds bearings 44 and 45 in proper position relative to both members and enlargement 43 of the connecting shank. Shank 42 is permanently attached to member 35 in any suitable way, but preferably by means of crosswisely arranged pins 48. The housing, casing or handle, shown in both Figs. 1 and 2, is preferably provided with a plurality of vent holes 49 so as to provide air circulation around the two connector members.

Figure 3:
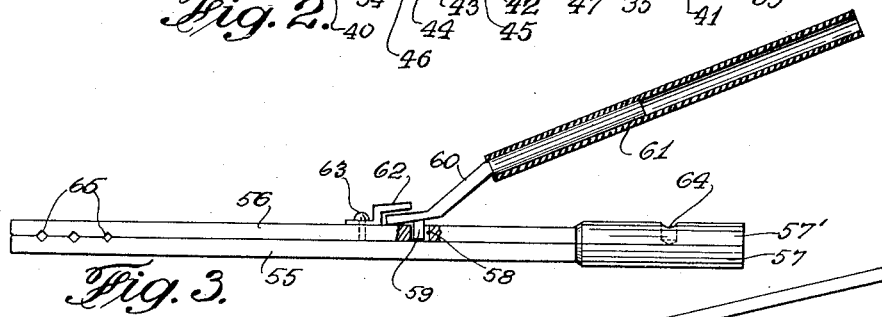
Fig. 3 is a detail view of an electrode holder intended to be secured within my device.
Figure 4:
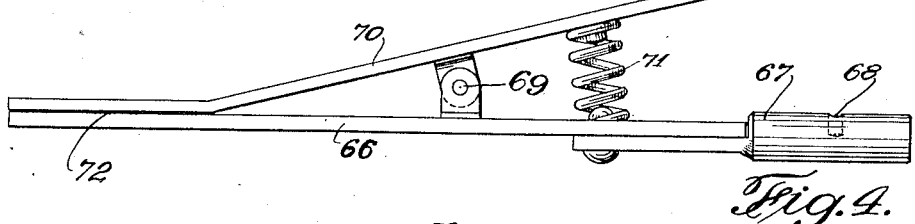
Fig. 4 is a ground clamp construction intended for attachment to my device.
Figures 5, 6:
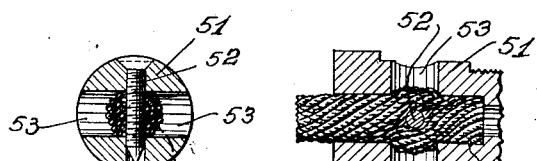
Fig. 5 is a transverse cross-sectional view through a typical cable and holding arrangement.
Fig. 6 is a longitudinal cross-sectional view through a cable holding socket, as employed in my device.

Both of the members are so constructed as to be capable of accommodating either cables, or a cable and a welding instrumentality, such as indicated in broken lines at 50 in Fig. 1, and shown in detail in the presently preferred forms at Figs. 3 and 4. When a cable is inserted into the sockets of any one of the members, indicated at 51 in Figs. 5 and 6, a cable-spreading screw 52 is passed through the cable at the vicinity or the center of the intersection between transverse enlargements or through passages 53 with the sockets 54, and a sufficient distance from the terminus of the cable, the cable is pierced and is forced out sidewise into enlargements 53 and is pressed against the four edges formed between the socket and the side enlargements so as to anchor the cable against disengagement from the socket. When a welding tool is used, spreading screw 52 is replaced by a set screw, the tool being provided with a suitable depression or recess for accommodating such set screw.

In Fig. 3 I have illustrated an electrode holder consisting of a pair of normally adjacent flat bars 55 and 56, terminating in half-round portions 57 and 57', forming an attachable shank of the tool. The bar 56 is pierced at 58 for accommodating a pin 59, attached to tool-spreading lever 60, provided with an insulating handle 61. Lever 60 is held against disengagement from bar 56 by a bracket 62, secured to the bar by means of screw or rivet 63. The rounded shank portion of the tool is recessed at 64 for accommodating a set screw. The flat adjacent faces of bars 55 and 56 are preferably provided with electrode holding notches 65.

A ground clamp, another tool attachable to my connector, is shown in Fig. 4 consisting of bar 66 secured to an attaching shank 67, which is again provided with a recess 68 for accommodating a set screw. Shank end 67 is cylindrical and is adapted to be inserted in the longitudinal passage of either the two members of my device. Hingedly connected at 69 with bar 66 is another bar 70, which is held in its normal position by an expansion spring 71. Both bars 66 and 70 have serrated faces at their adjacent ends, indicated at 72.

Either one of the two tools may be held with their rounded attaching shanks within the recesses or passages provided at the end of either one of the two members, but I prefer to secure either the electrode holder or the ground clamp to the stationary member of my device, as indicated in Fig. 1 in broken lines at 50.

While I have shown in the accompanying drawing connectors for electric conduits in the form of hollow handles, wherein one of the members is fixedly secured to the handle body, while the other member is rotatably mounted within the handle casing, it is quite obvious that any other type of housing enclosing the connector members may be substituted. Similarly, the detailed construction and connection between the two members of my device may be altered in any suitable manner, as long as both of the devices are freely movable relative to one another and wherein the connecting parts of the devices are provided with suitable friction reducing means to make such free movement of the two members readily possible. At the same time, of course, it is essential that the movable connection between the two members be electrically conductive so as to prevent possible sparking between the two members. This is achieved by the double bearing employed, but any other similar provision may be substituted as long as the principal effects as stated are maintained.

Obviously, in the course of manufacture, changes in structure may be required, and although I have shown two specific forms of my device, it is quite possible that it may become necessary to simplify and alter its construction for economic production. In consequence thereof, I wish to have it understood that I may incorporate changes and improvements in my invention within the broad scope thereof, as defined in the annexed claims:

1. In a cable connection, two electrically conductive cable receiving members revolubly connected with one another, and completely enclosed within a dielectric housing, open at both ends, whereby the cable receiving ends are rendered accessible from the open housing ends, the connection between the two members comprising an electrically conductive joint consisting of central guide means, bearings operatively secured upon said guide means, and means for operatively connecting said members and holding said bearings in place, said central guide means consisting of an elongated, substantially cylindrical shank, fixedly associated with, and extending from one of the members toward the other member, and adapted to revolve in respect to the latter member, said connecting means comprising a bushing held fixedly in place in respect to one of the members and in respect to the housing, said housing having perforations to provide air circulation and cooling for said cable receiving members, the latter having cable spreading means, some of the perforations in the housing being so arranged as to align with said cable spreading means to facilitate the operation of the latter.

2. In a cable connection, two electrically conductive cable receiving members provided with cable fastening means, and revolubly connected with one another within a dielectric perforated housing, open at both ends, one of the members being fixedly secured to the housing, both members being fully enclosed within, but accessible from the open ends of the housing, the connection between the two members comprising an electrically conductive revolving joint consisting, in part, of central guide means, forming a portion of one member and extending into the other member, a pair of spaced bearings operatively secured to the latter, and member connecting means, in the form of a bushing holding said bearings concentrically in place with respect to said members and said guide means, said cable receiving members being provided with cable spreading means operative from without the housing, some perforations of said housing being adapted to align with said cable spreading means.

3. In a cable connection, two electrically conductive cable receiving members provided with cable fastening means, and revolubly connected with one another within a dielectric, perforated housing, the connection between the two members comprising an electrically conductive revolving joint consisting, in part, of central guide means, a pair of spaced bearings operatively secured to the latter, and member connecting means holding said bearings concentrically in place with respect to said members and said guide means, and electrically conductive resilient means extending between said bearings, one of said members being fixedly united with said housing, the cable fastening means of both members being accessible from the open housing ends and comprising cable receiving sockets, through-passages transversing the sockets and apertures, passing through said sockets and passages, for the reception of cable spreading means, some of the housing perforations being adapted to align with said apertures for facilitating the insertion, removal and operation of such cable spreading means; said central guide means comprising a shank fixedly united with, and extending from one of the members, and centrally projecting into the other member.

4. In a revoluble cable connection, a perforated dielectric housing, open at both ends, a pair of electrically conductive revolubly connected cable receiving members within the housing, one of said members being removably attached to the housing, the other being free to rotate therewithin, a centrally located shank forming part of the connection between the two members, a pair of spaced bearings operatively supported by said shank, locking means for holding said members operatively together and for keeping said bearings in place, both members being provided with substantially cylindrical receiving and fastening means for a single cable end, said latter means comprising a substantially cylindrical passage transversing said cable receiving means, another passage transversing said first passage and said cable receiving means, and a cable end spreading screw removably mounted in said other passage and adapted to force a cable end, inserted in the receiving means into locking engagement with said first passage, so as to prevent any movement of such cable end in respect to the member, some of the perforations of the housing being adapted to register with said other passage for receiving the cable spreading screw, so as to facilitate the insertion, the removal and the operation of said screw.

5. A revoluble cable connection adapted to form a single electric conduit, comprising a tubular dielectric housing, open at both ends, a pair of electrically conductive cable connecting members revolubly joined with one another, a central instrumentality between said members, a pair of spaced bearings supported by said instrumentality, and means holding said members operatively together and simultaneously keeping said bearings in place, said housing having a plurality of apertures, one of said members being fixedly connected with said housing, the ends of said members forming cable or tool receiving sockets accessible through the open housing ends, through-passages transversing said sockets, screw receiving receptacles passing through said sockets and said passages and adapted to align with some of the apertures of the housing.

6. A revoluble cable connection, as set forth in claim 5, said instrumentality comprising a shank extending from one member towards said other, said shank and said holding means being provided with means for concentrically journaling said bearings.

7. In a revoluble cable connection, adapted to form a single electric conduit, a dielectric, perforated housing, open at both ends, and intended to serve as either cover or handle, a pair of electrically conductive cable receiving members within the housing and revolubly joined with one another and having means for securely holding ends of cables so as to prevent their movement relative to the said members, a central guide shank disposed between the members and concentrically arranged in respect to both, a pair of spaced bearings lodged upon said shank, means for operatively holding said bearings in place and for simultaneously operatively uniting said members, said cable end holding means of the members comprising a cable receptacle for a single cable end, a substantially cylindrical through-passage transversing the receptacle, and another, threaded throughpassage transversing both the receptacle and said first throughpassage, said latter through-passage being adapted to register with some of the perforations provided in the housing.

GERHARD JURKAT.